(12) United States Patent
Shvartsman

(10) Patent No.: US 7,304,828 B1
(45) Date of Patent: Dec. 4, 2007

(54) INTELLIGENT SOLID STATE RELAY/BREAKER

(76) Inventor: Vladimir A. Shvartsman, 7331 Intermodal Dr., Louisville, KY (US) 40258

( * ) Notice: Subject to any disclaimer, the term of this patent is extended or adjusted under 35 U.S.C. 154(b) by 202 days.

(21) Appl. No.: 10/946,841

(22) Filed: Sep. 22, 2004

(51) Int. Cl.
*H02H 9/02* (2006.01)

(52) U.S. Cl. .................................... 361/93.1

(58) Field of Classification Search ............... 361/93.1
See application file for complete search history.

(56) References Cited

U.S. PATENT DOCUMENTS

| | | | | |
|---|---|---|---|---|
| 4,291,357 | A | * | 9/1981 | Hong .......................... 361/101 |
| 6,433,978 | B1 | * | 8/2002 | Neiger et al. .................. 361/42 |
| 6,466,060 | B2 | * | 10/2002 | Lee .............................. 327/108 |
| 6,520,279 | B2 | * | 2/2003 | Fukumoto et al. ........... 180/446 |
| 2003/0095367 | A1 | * | 5/2003 | Mares et al. ................ 361/93.7 |

OTHER PUBLICATIONS

U.S. Appl. No. 11/496,362.

* cited by examiner

*Primary Examiner*—Michael Sherry
*Assistant Examiner*—Scott Bauer
(74) *Attorney, Agent, or Firm*—Clifford Kraft

(57) ABSTRACT

A solid-state relay/breaker that can replace mechanical units to control any type of AC or DC load. Power MOSFETs or other transistors control a load current. A bypass current sensing path monitors MOSFET current and causes a shutdown through signal processing in the event of an overcurrent condition. This shutdown resembles that of a slow-blow fuse where the rate of shutdown is proportional to the value of the current. This prevents shutdown on momentary spikes or in-rush. In addition, temperature and internal power supply voltages are monitored to determine additional operational conditions where over-temperature or voltages out of range can also cause shutdown. The MOSFET and current sensing path are turned on and off in staggered timing with different slew rates to provide built-in hysteresis. The device can be manufactured in any type of package to match any type of environment or existing replacement requirement.

23 Claims, 6 Drawing Sheets

INTELLIGENT SOLID STATE RELAY/BREAKER

BACKGROUND

1. Field of the Invention

The present invention relates generally to the field of electrical relays and breakers and more particularly to AC/DC intelligent solid state relay/breaker devices with current/temperature sensing, time-delay overloads and over-current/over-temperature protection.

2. Description of Related Art

Electromechanical relays have been used in the past in a wide-variety of power control and electrical applications. These mechanical devices which are generally constructed with a coil and contacts have demonstrated considerable reliability although they suffer from problems associated with having moving parts. In addition, mechanical relays are subject to arching and sparking. In applications, where it is required to switch a high DC voltage, the cost of a mechanical relay grows very rapidly. Also, the switching of the coil leads to voltage spikes (a fly-back voltage.) A lot of power is required to control the coil, and in high power relays, the coil can consume tens of watts. Material fatigue can shorten the life of a mechanical relay, and reliability can suffer due to shock and vibration.

These types of mechanical issues are major concerns when the relay is used in harsh environments. For example, many vehicles, such as submarines, cars, tractor/trailers, heavy vehicles and aircraft use a wide variety of relays in their systems. These relays are subject to constant vibrations introduced by the operation of the vehicles. Furthermore, many times relays built with mechanical contacts are exposed to environmental corrosive substances (liquid gases and the like) that lead to breakdown.

In addition to mechanical problems, electromechanical relays create abrupt "on" and "off" transitions thus introducing large transitional spikes. A large current surge many times welds contacts creating undesirable "shorted-on" malfunctions. In addition, sparking caused by connecting and disconnecting contacts can ignite surrounding gases and start fires.

Nowadays, some power devices are built with internal protection using a field-effect transistor with an integrated current and temperature sensing. This allows building a self-protective power device when there are only low-voltage field-effect transistors available. Some designs place a small-value resistor inserted in series with the load to measure a bypass current. This helps in some cases, but the extra generated heat makes that method unpopular. In addition, a current sense resistor adds to the overall resistance of the channel and thus reduces the efficiency of the device.

What is badly needed is an intelligent solid state Relay/Breaker that is integrated into a single package which exhibits a low output terminal resistance equal to the $Rds_{(on)}$ of the MOSFETs that is equipped with internal protection and control circuits to make the device rugged, efficient and compact for military, industrial or automotive loads in harsh AC and DC environments.

SUMMARY OF THE INVENTION

The Solid State Relay/Breaker of the present invention can be integrated into a single package and generally exhibits a low output terminal resistance equal to $Rds_{(on)}$ of MOSFETs (typically less than 10 ohms) with internal protection and control circuits to make it a rugged, efficient and compact device available for military, industry or automotive loads in harsh environments. Embedded I/O circuitry can make interfacing to an external micro-controller or microprocessor fairly simple with full logic-level compatibility. The present invention can generally include protection features such as over-temperature, under-voltage, over-current and slew-rate control that increase the survivability of the device against short circuits, stalled motors and excessive ambient conditions like temperature.

Also, a preset temperature sensor of around 95° C. (which can be set to any reasonable temperature) can also be incorporated. The relay/breaker of the present invention will turn off the output power transistors before they go into an avalanche breakdown. Designed to safely handle overload conditions, as well as other extraordinary conditions, the present invention eliminates switch failures with efficiency and no additional in part count. Full isolation between the input and output terminals make the present invention invaluable in High-Side and Low-Side switching applications. The internal protection insures the present invention of self-protection, protection of the load and insures a much longer useful life.

The present invention remedies many of the problems associated with mechanical relays by providing a solid-state relay/circuit breaker system which is much better equipped to protect a load compared to prior art electromechanical or solid-state relays and which introduces only a minimum amount of transitional spikes. Its current limiting capabilities are like that of a time-delay fuse; yet it is capable of withstanding a large surge of current that is often required during the initial turn-on cycle. Built-in variable slew features implement an internal slew rate control for soft turn-on/off that leads to a drastic reduction of destructive high-power spikes and lowers electromagnetic interference (EMI).

The present invention can incorporate digital, analog and mixed-signal processing to detect, control, communicate and manage under-voltage, over-current, over-temperature and temperature compensation to insure a high precision and stable response in a harsh environment. Either a parallel input or serial peripheral interface can be used for input communication.

The present invention can be configured to be used with conventional packaging systems. Specifically, these devices can be housed in boxes or packages having conventional footprints such as an ISO housing or packages with single-in-line pins for easy PCB assembly.

A central processing unit is generally used to control the device's function and may be built with a various configurations. Specifically, it can receive inputs from other devices such as toggle switches or other types of command control devices including digital controllers. Based on the status of an input, the central processing unit can control the device's status as a switch, either open or closed. Furthermore, the central processing unit may be used as a multiplexer with address decoding where several relays are connected to the output pins of a common processor, data and address bus, or a serial communication link such that the processor can selectively configure the polarity of relays based on input commands.

The relay/breaker of the present invention is particular well suited for applications with a high inrush current. It can be used as a power distribution switch with capacitive a load, or inductive loads like motors, solenoids or the initial excess current of an incandescent lamp. It will switch all types of resistive, inductive and capacitive loads and acts as a microcontroller compatible power switch. By replacing electromechanical relays, fuses and some discrete circuitry, the present invention can reduce the component count and thus the PCB size in many applications. It is an ideal replacement for electromechanical relays, breakers, the time-delay fuses in Programmable Logic Controllers, Distributed and Close-Loop Control Systems, DC and AC Loads, DC and AC motors, Valves, Solenoids, Heaters, Latches, Brakes, Junction Boxes, Lamp, etc.

Figure 1:
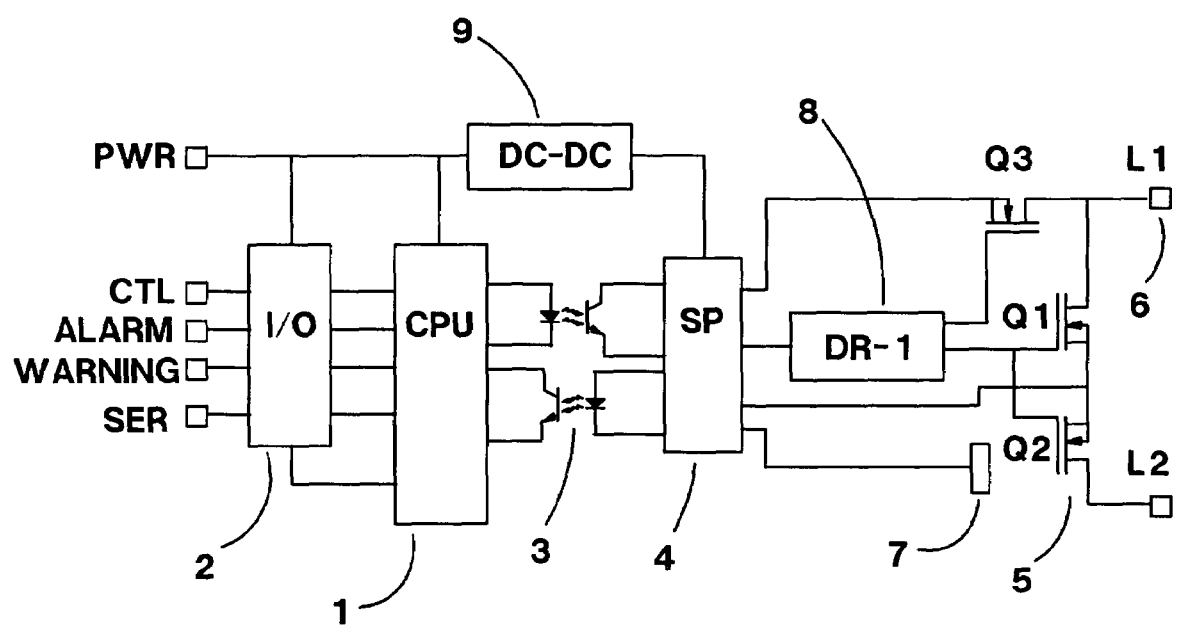
FIG. 1 shows a block diagram of an embodiment of the present invention configured as a SPST relay/breaker.

Several drawings have been presented to better illustrate the concepts of the present invention. The scope of the present invention is not limited to the embodiments shown in the drawings.

DETAILED DESCRIPTION OF THE INVENTION

FIG. 1 shows a block diagram of an embodiment of the present invention. A CPU module 1 is coupled to an I/O interface 2 so that the device can be controlled and/or communicated with from an external microcontroller or microprocessor. The CPU 1 is shown to be isolated from the high power part of the device by means of optical couplers 3. While it is preferred to use isolation, it is possible to construct an embodiment of the present invention with no isolation. A pair of such optical couplers 3 can provide two-way communication between a signal processing module 4 and the CPU 1. Any number of optical channels is possible; however, two channels as shown in FIG. 1 can provide sufficient communication. In the preferred method, one of the optically channels 3 can provide an enable signal from the CPU 1, and the other can provide an alarm to the CPU 1.

It is also possible to provide more sophisticated communication between the CPU 1 and the signal processing module 4. In particular, any form of serial or parallel communication of any channel width or bandwidth can be employed. This more sophisticated communication can be used when the signal processing module 4 contains its own controller or CPU.

The I/O interface 2 performs the very important function of interfacing various external devices (such as a semiconductor or mechanical contacts) that can generate various voltages with respect to the CPU. The I/O interface 2 conditions an external voltage to a voltage range that the CPU can work with out being damaged. It can also provide an alarm-out signal that can drive numerous external devices.

The signal processing module 4 turns the power MOSFETs 5 on and off to provide the relay/breaker action for power control. In FIG. 1, two power MOSFETS are shown and are labeled Q1 and Q2. These devices form the off and on power channel where AC or DC current flows. These MOSFETs are directly connected to power input/output pins 6 where the controlled load is coupled. The present invention can act either as a relay, turning the load off or on, or as a circuit breaker that is normally on, but turns the load off in an overload or over-temperature or over-current condition. The signal processing module 4 can make the device act as a slow-blow or time-delay fuse. In either use, the present invention remedies many of the problems associated with mechanical relays be providing a solid-state relay/circuit breaker.

The signal processing module 4 which is connected to the power MOSFETs 5 is an electronic control circuit that controls the on and off states of the field-effect transistors. Specifically this circuit monitors the voltage level at the input terminal and sends a control signal to turn off the MOSFET transistors 5 if the voltage rises above or falls below a predetermined level. In some embodiments, the present invention may further include a thermistor 7 that measures the temperature of the MOSFET transistors 5. This temperature value can be used by the signal processing circuitry to compensate the current with temperature and to send out an alarm out signal in the case of over-temperature.

Importantly, the present invention uses field-effect devices and electronic circuitry as opposed to the contacts, a coil and a downstream circuit breaker as used by conventional electromechanical relays. Unlike an electromechanical relay, this solid-state relay is free of the problems that can arise from having mechanical parts. The solid-state relay is free of arcing and sparking, and there are no contact materials to wear out or generate noise. Because of the use of electronic circuitry, the solid-state relay has a faster switching speed, and there are no switching voltage spikes from turning on the coil. Without moving parts that are subject to material fatigue, this solid-state relay has a much longer operating life, and is more reliable. Furthermore, by using semiconductor devices, the solid-state relay is resistant to shock and vibration. Since the present invention can be potted in a highly conductive epoxy resin, the solid-state relay/breaker of the present invention can work in any environment, including corrosive fluids.

Figure 2:
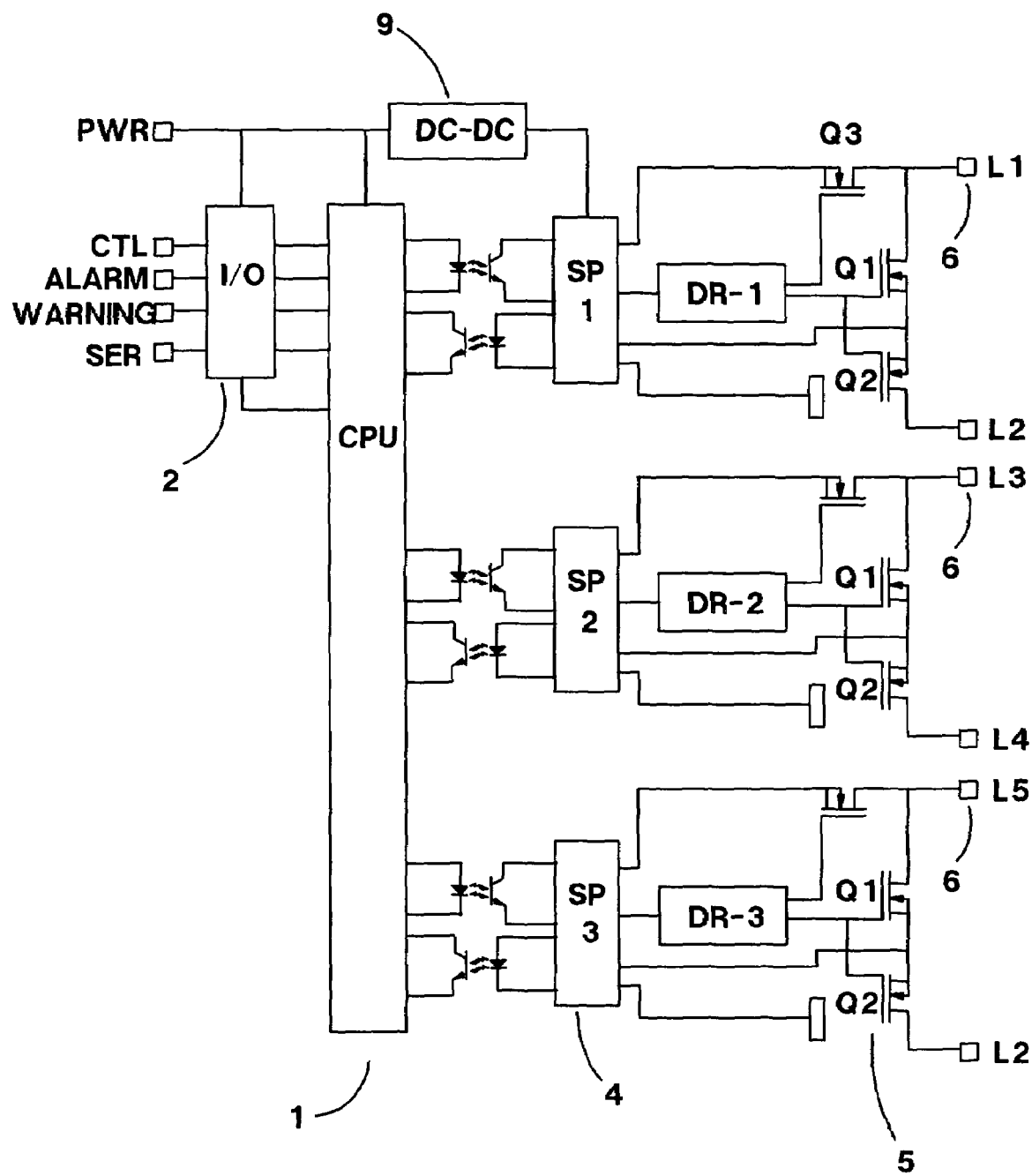
FIG. 2 shows an embodiment with multiple poles.

FIG. 2 shows an embodiment of the present invention with multiple signal processing modules 4 driving multiple MOSFET switches 5. The present invention can be used with any number of poles that the CPU 1 is capable of driving. In addition to the single throw ST configurations shown in FIGS. 1-2, the present invention is capable of driving double throw DT configurations where load current is routed from one path to another path. Any normal switch configuration such as SPST, SPDT, DPST, DPDT and multiple pole, multiple throw configurations are within the scope of the present invention.

Figure 3:
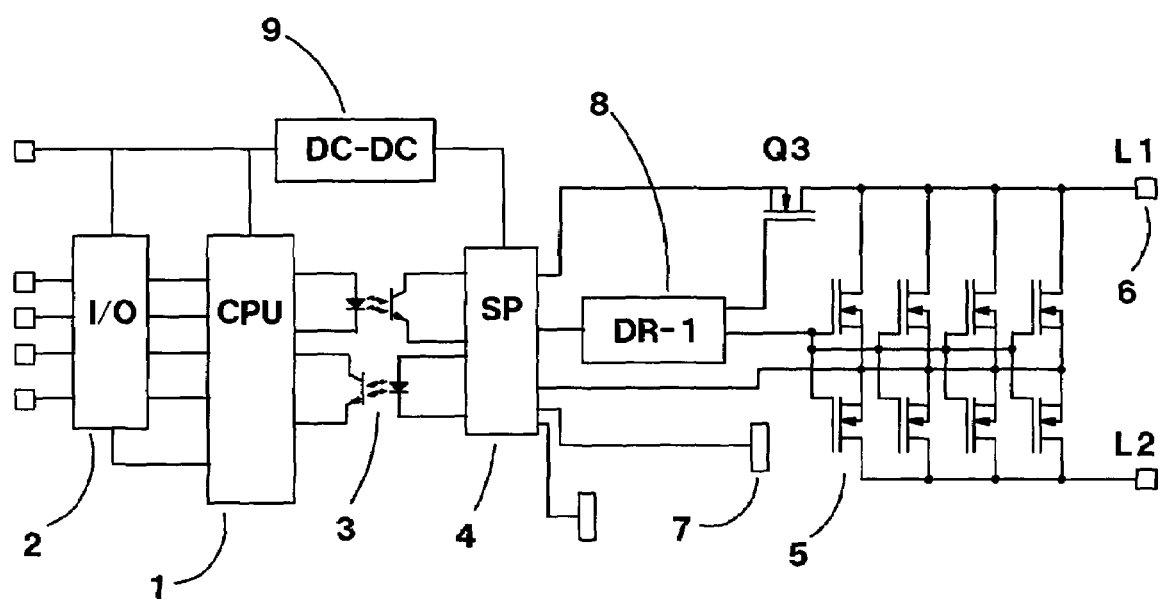
FIG. 3 shows a breaker with multiple pairs of parallel MOSFETs.

FIG. 3 shows an embodiment with multiple parallel output MOSFETs 5 for higher load currents. The present invention allows any number or combination of output transistor devices to be used in any series or parallel combination to be used to match any required load voltage or current requirements. While field effect transistors FETs, and particularly metal oxide field effect transistors MOSFETs are preferred as switches, any type of AC or DC switching device is within the scope of the present invention including bipolar transistors, thyristors and others.

It is within the scope of the present invention to place the MOSFET switches either entirely within the package, entirely exterior to the package or partially inside and partially outside the package. By allowing this build-out of the power switching devices, different configurations can be designed by the user to handle various load voltage and current requirements.

The embodiment shown in FIGS. 1-3 can contain a sensing field-effect transistor Q3 (see FIG. 1), a driver DR-1, signal processing module SP 4, as well as the pair of optical couplers 3 and a central processing unit CPU 1. In addition, the device can contain several temperature sensors. A DC-DC converter 9 can convert a power supply DC source voltage to a correct voltage to run the signal processing module 4 and other parts of the circuit.

The signal processing circuitry SP 4, may be implemented in various ways and may include a microcontroller with several analog-digital converters A/D and I/O ports to receive/send commands as well as other needed components. The present invention may include high-speed fill-wave bridges, low-pass and high-pass filters, voltage watch-dog, current-sensing amplifiers, temperature amplifiers, compensation circuitry, circuitry to generate control signals for the driver transistor DR-1 and the optical coupler back to the CPU 1 as well as the logic circuitry to provide duplex communication with the CPU 1 and the means of inputting and transmitting information.

The signal processing modules 4 shown in FIGS. 1-3 directly control the power MOSFET switches 5 and are used to control these switches dynamically. These signal processing circuits (SP-1, SP-1, etc.) 4 can process at least two analog signals: one from an analog temperature sensor, and the other a sample of residual voltage that can come from one of the power MOSFETs (such as Q1). Multiple temperature sensors can be used. The signal processing module 4 can also process at least two logical signals: one from an optical coupler (ISO-1) from the CPU 1 and the other(s) from integrated temperature sensors that can generate a logic a signal if the surrounding temperature reaches a predetermined high threshold such as 95° C. Integrated temperature sensors can also measure the surrounding temperature to allow precise compensation of current-sensing amplifiers due to the changes of the on-state resistance of the power MOSFETs.

The signal processing module 4 can continually measure internal power supply voltages at a plurality of points. While the preferred number is five points, the signal processing module can measure any number of voltage points. Generally a samples are taken of the voltage at the output of the DC/DC converter, the +/−12 VDC that is used for analog filters and amplifiers, the gate-driving voltage, the +11 VDC that is applied to the Q3 transistor and the paired MOSFETs, and the +5 VDC logic voltage for internal logic circuitry. The signal processing module 4 SP will shut down both transistors and send a signal to the CPU via the optical coupler if any voltage falls below the predetermined level.

A control signal that comes from the signal processing module 4 is fed to the driver DR-1 that in turn will generate two control signals to turn on the sensing MOSFET transistor (Q3) and the paired power MOSFETs Q1 and Q2 5. The signal processing module 4 can contain a sophisticated driver that generates the two control signals in certain time staggered alignment that is quite different for each signal. The signal that drives a MOSFET (Q3) can be a fast-sloped signal that is generated with a slight delay with respect to the signal that drives a pair of power MOSFETs (Q1 and Q2) which is normally a slow-sloped signal. The Q3 transistor normally turns on after Q1 is fully conductive and thus behaves exactly as a resistor. Q3 turned off a prior to the ending of the control signal that drives Q1 and Q2. The Q1 and Q2 control signals have unique slew properties which drastically reduce the transitional spikes on the rising and falling slopes at the load. These slew properties will be discussed subsequently.

An example will now be given of the functioning of a particular embodiment of the present invention. That embodiment is best understood by reference to FIG. 1. The power supply is continually sensed by the input/output (I/O) interface circuitry 2 and the signal processing (SP) module 4. The information is processed by the CPU 1 to continually determine device readiness. The CPU sends an alarm-out signal for use by an external device which is in the non-alarm state when the device is ready. The alarm-out output signal can be current limited and fully protected against electrostatic discharge (ESD) and shorting to the ground. Typically, it can deliver about 10 mA of current and can be connected to ground indefinitely. It normally stays high as long as the device is functioning and no alarm event such as over-current, under-voltage, and over-temperature is detected. Typically a logic high would normally be an indication that the device is operative and ready for a command.

The control signal input is normally a logic low input internally pulled-up to the power supply through a 10 KOhm resistor. It is usually designed with a wide hysteresis so that it turns ON when the input is pulled below ⅙ of power supply and turns off when the input floated or pulled above ½ of power supply. This particular design insures extremely high noise filtering thus avoiding the nuisance of a faulty turn on/off. Both input terminals (the alarm-out and control signal) are normally kept low when the power supply stays outside of the normal range for the device's operation. Once, the CPU has received a signal from the input interface 2 and a signal from the signal processing module 4 that the power supply is within the tolerance, and the control signal line is pulled down commanding the device to operate, it applies a voltage to the optical-coupler and hence to the signal processing module 4 to turn on the power MOSFETs.

Upon receiving a command this command signal from the CPU 1, the signal processing module 4 generates an enable signal that is applied to the driver (DR). Once enabled, the DR driver generates two signals. First, it applies a signal to turn-on the power paired field effect transistors (the power MOSFETs 5) and then, with a slight delay, it applies another signal to turn-on the sensing transistor Q3. At that moment, information about the bypassing current begins being processed, and if its level holds inside of the allowed tolerance range, and the internal temperature does not reach the limit, the device maintains its on status without change until the control signal on the outside terminal is taken down (allowed to go high). This is the steady on state where AC or DC current from the load is conducted through the device. In this state, the device behaves as a circuit breaker or an ON relay. This state will continue indefinitely until either the control signal command is removed or an over-current or over-temperature event takes place.

During this steady-state ON condition, the signal processing module 4 constantly monitors the bypass current, the internal temperature and the voltage level of both power gates and the power supply. All gathered information must be processed with high accuracy, because it is vitally important that their values stay in the tolerance for proper operation and self-protection. If any parameters go out of range, the signal processing module 4 applies a voltage onto the optical isolator, in this manner sending information to the CPU 1, and at the same time turning off the signal that enables the driver DR. As soon as the driver reaches its turned off state, it will shutdown the paired power MOSFETs 5. Once the CPU 1 receives the alarm information from the signal processing module 4, it sends a command to the I/O interface 2, and the I/O interface turns-off the alarm-out output sending out an external alarm.

A description of a particular embodiment of a signal processing module 4 will now be given. It must be remembered that signal processing circuitry can be built numerous ways and that the selection of a particular solution will depend on the requirements of a particular application. While this particular embodiment is given to illustrate the concept, any signal processing method or technique that can control power transistor switches is within the scope of the present invention.

Figure 4:
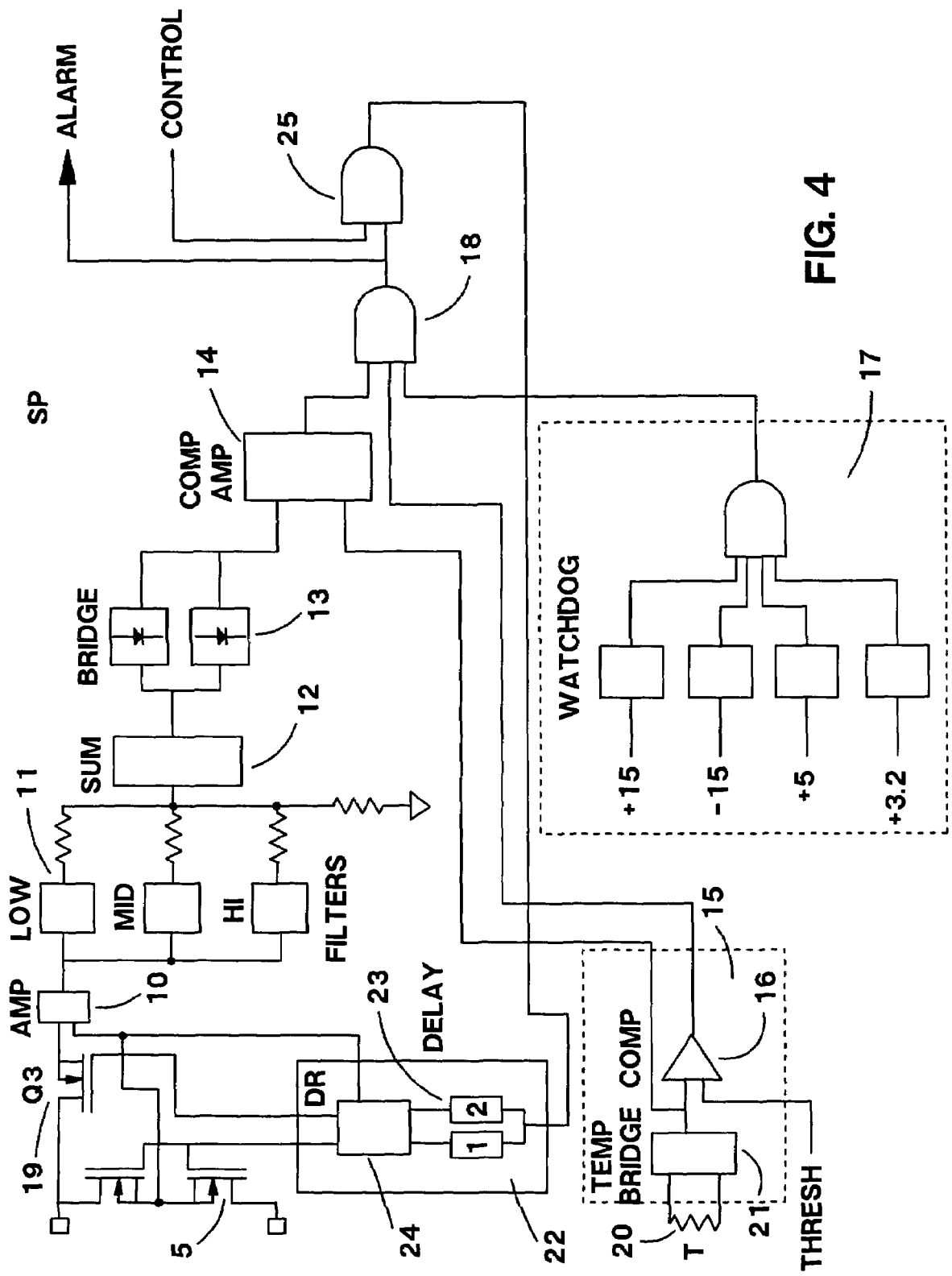
FIG. 4 shows a block diagram of an embodiment of signal processing circuitry.

Turning to FIG. 4, a block diagram is seen of a possible signal processing module. This diagram is presented as an example to help explain what is involved in building an electronically reset able, solid-state relay/contractor that behaves like a time-delay or a slow-blow fuse. Overall the circuit in this example consists of; (1) a pre-amplifier and attenuator circuitry 10, (2) filtering block containing of a low-pass, middle-band pass and high-pass filter 11, (3) summing network 12, (4) high-speed, full-wave precision rectifier 13, (5) compensatory amplifier 14, (6) cut-off temperature detector 20, (7) analog temperature amplifier 15, (8) power supply watchdog 17 and (9) control logic 18.

The signal processor module's main functions are disabling the CPU control signal and processing an input signal (indicating bypass current) in the manner similar to the current-time property of a time-delay fuse. The CPU control signal will be disabled if: (1) there is a problem with power supplies, (2) the MOSFETs temperature reaches a maximum allowed value and (3) the bypass current reaches the predetermined limit.

The signal processor is able to always carry on all of its functions because an external power supply is applied to it from an isolated power converter. All internally generated power supplies are being checked for integrity; the temperature of the power MOSFETs is monitored, and the presence any signal applied into the pre-amplifier is monitored. As soon as all monitored values are measured inside of their expected ranges, the output of 3-input AND gate 18 will go "high" thus enabling the 2-input AND gate 25 sending a "ready" signal to the CPU via an optical-coupler.

An enable control signal from the CPU via an optical-coupler will generate a control signal on the output of the AND gate 25 into the MOSFET's driver as long as the output of the AND gate 18 stays "high" or logic "1". When the control signal reaches the MOSFET's driver, it generates two signals to turn on a pair of power MOSFET transistors (Q1 and Q2) 5 and a sensing MOSFET transistor (Q3) 19. The MOSFET driver 22 is designed in such manner that it turns on first the pair of MOSFETs (Q1 and Q2) 5, and then with a delay of about 100 nanoseconds, turns-on the MOSFET current monitoring transistor (Q3) 19. The turn-off cycle reverses the timing. First Q3 will be turned off, and about 70 nanoseconds a turn-off command will reach the pair of power MOSFETs (Q1 and Q2). The signal on the bypass current transistor Q3 19 usually has a fast slew rate, while the signal to the power MOSFETs 5 usually has a slower slew rate.

Once Q1 and Q2 are turned-on, any bypass current generates a voltage drop across Q1's internal resistance (ON-resistance). That voltage drop through Q3 19 is applied to the pre-amplifier 10. This pre-amplifier is built around a high-speed, high-input impedance IC chip with input protection and sufficient gain to amplify the input signal for further signal processing. The linear amplifier 10 applies signals in a wide frequency band, DC—25 MHz, and from a few millivolts (reflection of a low current) to a several volts (as the result of transitional power surge). It is input protected against catastrophic failure of Q3 and high voltage spikes.

The output of 10 is connected to a filtering block 11 comprised of three filters; a low-pass, middle-band and high-pass filter. The filter outputs are combined across a summing network 12 to process the incoming signal a way that allows the device to withstand a high current surge that is at least 15 times the average current without tripping off. The filters are designed for minimizing the chance of a false trip and to protect the device and the load from being destroyed by an over-current condition. The present invention is designed to pass a short surge of current to a load to satisfy current requirements during a transitional cycle. There are numerous possible final specifications that can be achieved by varying the filter and input design. Selection of exact filter parameters such as bandwidth, skirt and filter type are very much dependent on the type of time delay desired on an overload and what response is required. A preferred embodiment is that the low pass filter can have a 4th order Butterworth response with a bandwidth of DC—0.1 Hz. The main function of the low pass filter is to provide information on the average current (with all high frequency content removed). The mid-band filter of the preferred embodiment can have a 2nd order Chebyshev response with a bandwidth from 1 Hz to 10 KHz. This can be implemented as a 2nd order Chebyshev high pass filter cascaded with a 2nd order Butterworth low pass filter. The high pass filter of the preferred embodiment can have a 4th order Butterworth response with a cutoff of around 15 KHz. The high pass filter provides fast response to transient conditions. The circuit can be allowed to roll off on the high end above about 25 MHz. It should be remembered that these filter specifications are only examples. Many other types of filter specifications and frequency ranges can be used and are within the scope of the present invention.

The input signal is divided by the three band-pass filters into three frequency bands with individual amplitudes depending on the particular input signal. Corresponding to the current-time property of a time-delay fuse, all three signals are combined again via the summing network 12. Many different sum weightings are within the scope of the present invention. The output of the summing network is applied to a high-speed, precision, full-wave rectifier 13. This allows control of either DC or AC power, and the sensed voltage can be of either polarity. Full-wave rectification is used to prepare a signal of either negative or positive polarity for a further processing. The rectified signal is applied to a compensatory amplifier 14.

The following table shows the relationship between current and average time of response for shutting down the MOSFETs. This relationship achieves the action of a slow-blow fuse set to 8 Amps RMS.

| | |
|---|---|
| 8A | indefinitely |
| 9A | 50.0 Second |
| 10A | 35.0 Second |
| 20A | 16.0 Second |
| 30A | 5.9 Second |
| 40A | 0.67 Second |
| 50A | 0.063 Second |
| 60A | 0.00577 Second |
| 70A | 0.0004438 Second |
| 80A | 0.0000296 Second |
| 90A | 0.0000070 Second |
| 100A | 0.0000010 Second |

| | |
|---|---|
| 110A | 0.0000002 Second |
| 120A | 0.00000004 Second |

It should be remembered that these numbers are merely representative of one possible embodiment of the present invention. Any response that results in a slow-blow property is within the scope of the present invention.

The signal processing circuitry must maintain specified control over wide temperature swings. This is achieved by maintaining the temperature of the power MOSFETs within a certain predetermined range. There are many possible ways the solution can be implemented, and one, two or more temperature sensors can be used for compensation and alarm. The example of FIG. 4 employs a single temperature sensor 20 (thermo-resistor) to provide a required voltage to compensate for changed parameters, and to alarm in the case critical overheating. This sensor is conditioned and compared with a threshold by a temperature control circuit 15.

The power MOSFET Q2's internal on-resistance changes with temperature, and that in turn increases the level of the input signal proportionally to increase of the on-resistance. The compensation is introduced to insure the device's high accuracy over a wide temperature swing. A thermo-resistor 20 placed in very close proximity to Q2 forms part of a Winston bridge shoulder, and changes its value with temperature. There are many inexpensive temperature sensors with built-in amplifiers as well as logic and analog outputs on the market today. They can be used alternatively to simplify the design. The temperature sensor 20 affects the bridge balance proportionally to the temperature of Q2. The residual amplified by the amplifier 21 is also fed to the compensatory amplifier 14 and into a comparator 16. There are some MOSFETs on the market built with an internal temperature sensor on the market, and that sensor can be used instead of the thermo-resistor 20. Unfortunately the limited variations of such MOSFETs available make them unusable in some applications. The output of the comparator 16 is used to shut off the 3-input AND gate 18 in the event of an over-temperature condition.

The compensatory amplifier 14 performs three functions; (1) it subtracts the analog temperature amplifier's 21 signal out of the signal that came from the precision full-wave bridge 13; (2) it compares the resulting voltage against a reference voltage (like a threshold detector), and (3), it generates an output signal, logical "0" or "1" depending on which is larger, the reference or the resulting voltage.

The 3-input AND gate 18 requires that all of its inputs to stay high or "1" for a signal from the CPU to reach the power MOSFETs 5 and enable current flow between the output terminals. The 3-input gate's output will stay high as long as the following conditions are met: the power supply watchdog 17 generates "1"; the signal from the full compensatory amplifier 14 indicates proper bypass current; and the temperature is in range.

The power supply watchdog 17 in this example checks four internal voltages (+15 VDC, −15 VDC, +5 VDC and 3.2 VDC), and if any voltage falls below its predetermined low limit, the circuit will generate a low or "0" on the output gate (in box 17) and hence put a low onto the input of the 3-input AND gate 18.

The second input of the 3-input AND gate 18 is connected to the output of the comparator 16. Its output stays high or "1" as long as the reference voltage is larger than a voltage comes from the temperature amplifier 2 meaning that the temperature is in range.

The third input of the 3-input AND gate 18 is connected to the compensatory amplifier 14. Its output will go low (logical "0") if the resulting signal becomes larger then the reference voltage indicating that the bypass current is out of range. Once the 3-input AND gate 18's output goes high or "1", it will energize the light emitting diode of an optical-coupler thus delivering information about the signal processor module's readiness to the CPU.

The block 22 in FIG. 4 shows a possible embodiment of the block labeled DR in FIG. 1. This circuitry is the MOSFET driver that directly controls whether Q1 and Q2 5 are on or off. This circuitry also controls the slew rate and delay of turn-on and turn-off as previously described. Delay control is accomplished by causing control signals to pass through delay lines 23 before being applied to a level-shifting device 24 that provides the correct voltage and current levels to control the power MOSFETs as well as the correct slew rates. As previously stated, the preferred delays are 100 ns on and 70 ns off.

Figure 5:
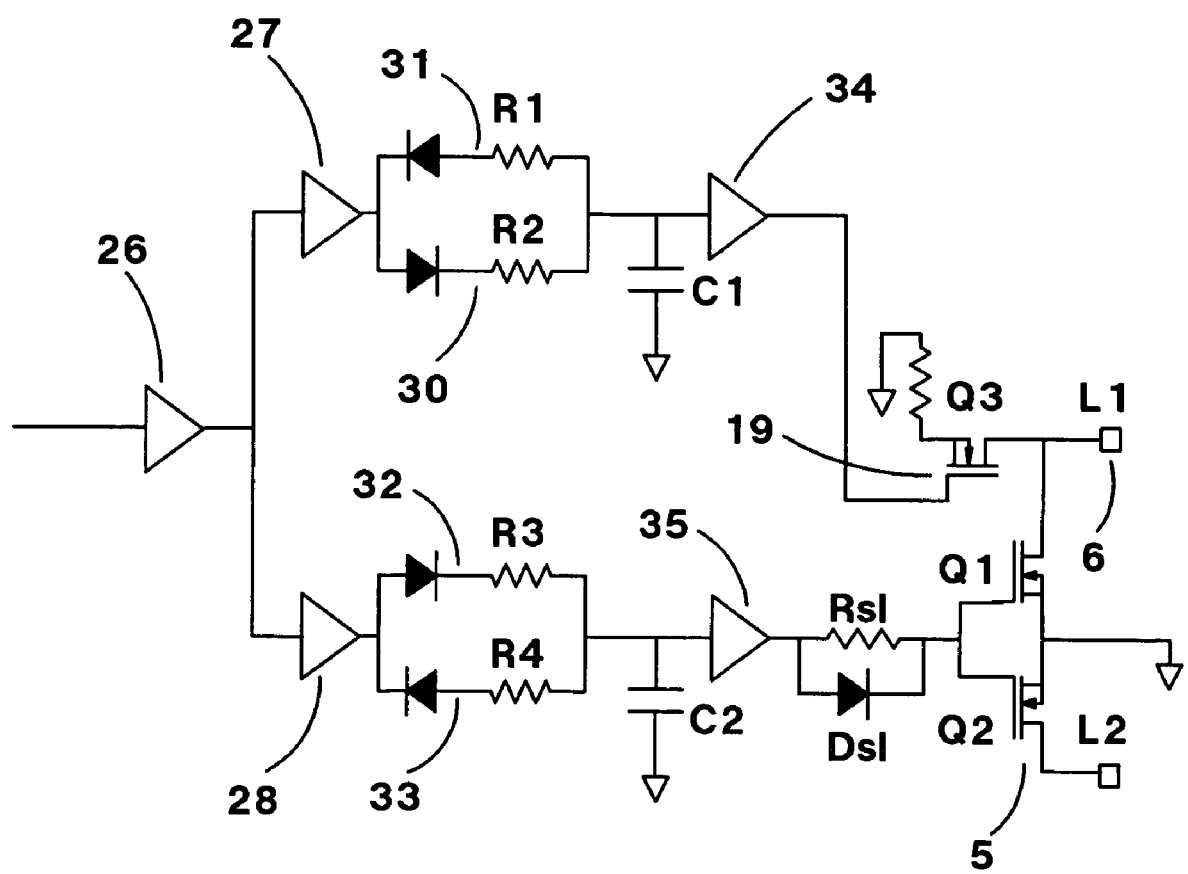
FIG. 5 shows a schematic diagram of a driver circuit.

FIG. 5 shows a particular embodiment of the circuit marked DR 22 in FIG. 4. This circuit controls the turn-on and turn-off of the power MOSFET devices. FIG. 5 shows a simple diode-resistor-capacitor network that can create various turn-on and turn-off delays by changing the values of resistors (marked R1, R2, R3 and R4). The turn-on/turn-off control signal enters the circuit through a buffer amplifier 26. This is routed to an upper leg through an amplifier 27 to control the bypass current transistor Q3 19 and a lower leg through and amplifier 28 to control the power MOSFETs Q1 and Q2 5. The signal is split into a Q3 turn-on chain 30, a Q3 turn-off chain 31, a Q1 turn-on chain 32 and a Q1 turn-off chain 33. The Q3 chain contains a capacitor C1 and a driver 34; the Q1 chain contains a capacitor C2 and a driver 35.

In order to turn on Q1 earlier than Q3, the time constant of the turn-on chain of Q1 which is R3×C2 should be smaller than the time constant of the turn-on chain of Q3 which is R2×C1 (an approximation to the time delay is 0.7×R×C). In order to turn off Q7 earlier than Q1, the time constant of the Q1 turn-off chain R4×C2 must be larger that the time constant of the Q7 turn-off chain R1×C1. This can be accomplished by choosing C1 equal to C2, with R4 larger than R1.

A properly driven MOSFET can be turned on and off rather fast (about 80 nS). Such fast transitional speed allows building fast switching devices without generating extra heat and wasted power. However, this creates another problem. All loads can be described as a combination of capacitance, inductance and resistive components. The inductive part of a load causes a major problem if the source of power is suddenly removed. The energy stored in the magnetic field of the inductance becomes a voltage transient as the field collapses. This type of transitional spike can exceed the applied voltage by 10-20 times. As a rule of thumb, the faster the turn-off cycle, the higher the voltage of the spike and hence the higher the potential for damage. Taking this into consideration, it is very important to find a compromise between generated heat from an over-current condition, and protection of the load from large amount of energy in the generated turn-off spike. From a heat perspective, it is desirable to turn-off as fast as possible; from a spike perspective, it is desirable to turn-off at a slow rate. The solution is slew-rate control such as shown in FIG. 5. Here, the solution uses a resistor Rsl and a diode Dsl that act in series with the input capacitance of Q1 and Q2. During the turn-on transition, Dsl shorts out Rsl because its on-resistance is very small. Hence, the turn-on transition, the slew-rate is determined by the time constant of the on-resistance of Dsl and the input capacitance of Q1 and Q2 5. During turn-off, the time constant of the resistor Rsl in parallel with the input capacitance of Q1 and Q2 controls the slew-rate since the diode Dsl becomes reverse biased. This particular solution results in a very fast turn-on slew-rate and a slower, more controlled turn-off slew-rate. This turn-off slew reduces any transient voltage spike. It should be understood that this is one example of a controlled slew-rate turn-on/turn-off. Any slew-rate control is within the scope of the present invention.

Figure 6:
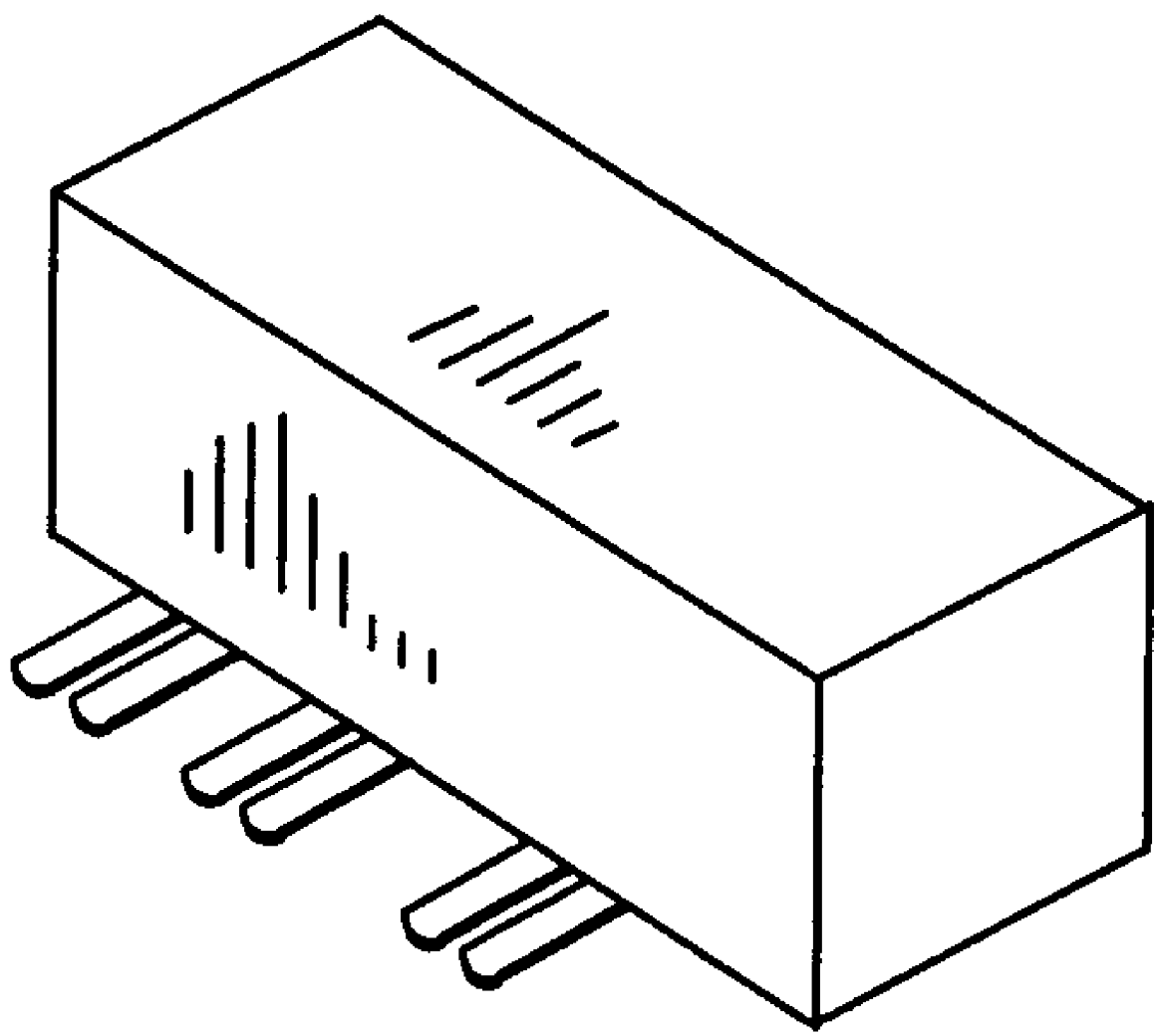
FIG. 6 shows a typical PCB package.

The present invention can be housed in similar footprints as mechanical relays or in any type of package or footprint. FIG. 6 shows a package used for printed circuit boards PCBs. Normal relay footprints have single-in-line pins for easy printed circuit board mounting or plug-in sockets. However, there are other ways that the relay could be assembled and package. For example, the relay could be assembled on a circuit board having functional sub-blocks and components spread through it and connected by conductive traces to other system. Any footprint or package is within the scope of the present invention. In particular the present invention can be fitted into packages that replace existing applications.

The CPU of the present invention may also be used to accept control inputs from a remote location for configuring the device. Where the present invention is used with a power distribution center, such as in submarine, to provide power from an AC generator and, in the case of an emergency switch to DC power from a battery, the present invention may also be used as a multiplexing device. Specifically, numerous units of the present invention can be connected to the distribution center where each is connected to a separate point on a common control device (a microprocessor for example) such that the control device can individually control each relay through output to designated pins. In this embodiment, the microprocessor acts as a central control device for controlling various connected relays. The microprocessor may also be considered a multiplexer in this context in that it can receive inputs from various switches and selectively configures different relays based on these control inputs. For example, a common microprocessor may be connected to two separate relays via a power distribution center. One relay may control a DC motor while another relay may control a solenoid.

The CPU of the present invention can be used to program the device to work as a flasher when it is combined with a lamp to produce pulse-width modulation for a precise duration of time, for example, by controlling a solenoid in soft-stop mode or controlling valves or a power control by implementing a pulse-width modulation control. Various durations and configurations of a time-delay switch can be implemented this way. The present invention relates to both normally open NO relays and normally closed NC relays. Either configuration can be realized with the present invention.

Many modifications and other embodiments of the invention set forth herein will come to mind to one skilled in the art to which these inventions pertain having the benefit of the teachings presented in the foregoing descriptions and associated drawings. Therefore, it is to be understood that the invention is not to be limited to the specific embodiments or drawings disclosed, and that modifications and other embodiments are intended to be included within the scope of the appended claims. Although specific terms are employed herein, they are used in generic and descriptive sense only and not for purpose of limitation.

I claim:

1. A solid-state power relay/breaker comprising:
    at least one solid-state power switching device, said power switching device connected to a load;
    a bypass current sensing path coupled to said power switching device, said bypass current sensing path providing a bypass current proportional to current through said power switching device;
    a signal processing circuit connected to said bypass current sensing path, said signal processing circuit sensing said bypass current in at least three different frequency bands to turn off said power switching device within a delayed time, said delayed time depending on said bypass current;
    said power switching device being turned on by a first control signal and said bypass current sensing path being turned on by a second control signal, both of said control signals produced by said signal processing circuit in response to a command signal;
    said first and said second control signals having controlled slew rate wherein turn-on slew rate is faster than turn-off slew rate.

2. The solid-state power relay/breaker of claim 1 wherein said signal processing circuit senses at least one other parameter related to said power switching device, said signal processing circuit turning said power switching device off when said other parameter exceeds a predetermined threshold.

3. The solid-state power relay/breaker of claim 2 wherein said other parameter is temperature.

4. The solid-state power relay/breaker of claim 1 wherein upon a turn-on command signal, said signal processing circuit turns on said power switching device before said current bypass sensing path.

5. The solid-state power relay/breaker of claim 4 wherein said power switching device is turned on around 100 ns before said current bypass sensing path.

6. The solid-state power relay/breaker of claim 1 wherein upon a turn-off command, said signal processing circuit turns off said power switching device after said current bypass sensing path.

7. The solid-state power relay/breaker of claim 6 wherein said current bypass sensing path is turned off around 70 ns before said power switching device.

8. The solid-state power relay/breaker of claim 1 further comprising a power sensing circuit monitoring a plurality of internal voltages, said power sensing circuit turning off said power switching device if any of said plurality of internal voltages is outside of a particular predetermined range for that voltage.

9. The solid-state power relay/breaker of claim 1 wherein said signal processing circuit is controlled by a processor.

10. The solid-state power relay/breaker of claim 9 wherein said processor receives at least one command signal from an external circuit.

11. The solid-state power relay/breaker of claim 9 wherein said processor transmits at least one alarm signal to an external circuit.

12. The solid-state power relay/breaker of claim 1 wherein said solid-state power switch transistor includes at least one pair of power MOSFET transistors.

13. The solid-state power relay/breaker of claim 1 wherein said current sensing path contains a MOSFET transistor.

14. The solid-state power relay/breaker of claim 9 wherein said processor is optically isolated from said signal processing circuit.

15. A solid-state relay/breaker having over-current characteristics of a slow-blow fuse of the type used to control high power AC or DC loads, the relay/breaker being commanded to turn on or off by a digital control signal comprising:
- at least one pair of MOSFET power transistors controlling a load current;
- a current sense path sensitive to at least three different frequency bands providing a feedback value proportional to said load current, said current sense path being sensitive to both AC and DC load currents;
- a signal processing circuit coupled to said current sense path for turning off said MOSFET power transistors after a delay using a pair of control signals when said load current exceeds a predetermined threshold, said delay being related to said load current, said control signals having a fast turn-on slew rate and a slower turn-off slew rate;
- said signal processing circuit also acting in response to a turn-on/turn-off command to switch said MOSFET power transistors and said current sense path off or on, switching of said MOSFET power transistors and said current sense path occurring with staggered timing.

16. The relay/breaker of claim 15 further comprising a CPU optically coupled to said signal processing circuit.

17. The relay/breaker of claim 16 wherein said CPU accepts standard logic inputs and provides standard logic outputs.

18. The relay/breaker of claim 15 further comprising temperature monitoring, wherein said signal processing circuit turns off said MOSFET power transistors upon occurrence of an over-temperature condition.

19. The relay/breaker of claim 15 further comprising internal voltage monitoring, wherein said signal processing circuit turns off said MOSFET power transistors upon detection of over-voltage or under-voltage conditions of one or more internal voltages.

20. A method for providing a slow-blow solid-state relay breaker action comprising the steps of:
- providing a MOSFET power switch transistor pair to switch current from a load;
- providing a current sense transistor to provide a bypass current proportional to load current flowing through said MOSFET power switch transistor pair;
- providing signals in at least three different frequency bands for determining if said bypass current is within range;
- providing delayed turnoff to said MOSFET power switch transistor pair using a first control signal when said bypass current exceeds a predetermined threshold, said delayed turnoff related to said bypass current;
- turning on said MOSFET power switch transistor pair using a second control signal before turning on said current sense transistor when starting said solid-state relay/breaker;
- and wherein said first control signal has a faster slew-rate than said second control signal.

21. The method of claim 20 further comprising the step of turning off said current sense transistor before turning off said MOSFET power switch transistor pair when stopping said solid-state relay/breaker.

22. The method of claim 20 further comprising the step of monitoring temperature of said MOSFET power switch transistor pair and shutting off said MOSFET power switch transistor pair in an over-temperature condition.

23. The method of claim 20 further comprising the step of monitoring internal voltages and shutting off said MOSFET power switch transistor pair when any monitored internal voltage goes out of range.

* * * * *